United States Patent
Ye et al.

(10) Patent No.: US 11,075,541 B2
(45) Date of Patent: Jul. 27, 2021

(54) SIGNAL TRANSMISSION SYSTEM AND SIGNAL TRANSMISSION METHOD

(71) Applicant: HANGZHOU HIKVISION DIGITAL TECHNOLOGY CO., LTD., Zhejiang (CN)

(72) Inventors: Min Ye, Zhejiang (CN); Mingling Luo, Zhejiang (CN); Si'en Zhang, Zhejiang (CN); Liang Zhang, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 16/640,702

(22) PCT Filed: Aug. 15, 2018

(86) PCT No.: PCT/CN2018/100668
§ 371 (c)(1),
(2) Date: Feb. 20, 2020

(87) PCT Pub. No.: WO2019/037639
PCT Pub. Date: Feb. 28, 2019

(65) Prior Publication Data
US 2020/0185961 A1 Jun. 11, 2020

(30) Foreign Application Priority Data
Aug. 22, 2017 (CN) .......................... 201710726380.0

(51) Int. Cl.
*H02J 13/00* (2006.01)
*H02J 1/04* (2006.01)
*H02J 1/12* (2006.01)

(52) U.S. Cl.
CPC .......... *H02J 13/00036* (2020.01); *H02J 1/04* (2013.01); *H02J 1/12* (2013.01); *H02J 13/00009* (2020.01)

(58) Field of Classification Search
CPC .. H02J 13/00036; H02J 13/00009; H02J 1/04; H02J 1/12; H02J 13/00; H04N 7/10; H04N 7/18; H04B 3/548
See application file for complete search history.

(56) References Cited

U.S. PATENT DOCUMENTS

| | | | |
|---|---|---|---|
| 5,396,555 | A | 3/1995 | Shibata et al. |
| 9,252,842 | B2 | 2/2016 | Mutzabaugh et al. |

(Continued)

FOREIGN PATENT DOCUMENTS

| | | |
|---|---|---|
| CN | 102625075 A | 8/2012 |
| CN | 103812527 A | 5/2014 |

(Continued)

OTHER PUBLICATIONS

First office action in Chinese application No. 201710726380.0 dated Feb. 25, 2020.

(Continued)

*Primary Examiner* — Daniel Cavallari
*Assistant Examiner* — Thai H Tran
(74) *Attorney, Agent, or Firm* — Knobbe Martens Olson & Bear LLP

(57) ABSTRACT

A signal transmission system comprises: a power supply, a power sourcing device and a powered device connected to each other through a coaxial cable; the power sourcing device comprises a first active inductor module for receiving a DC signal transmitted by the power supply, and transmitting the DC signal to the powered device through the coaxial cable, a first capacitor module for receiving a superposed signal transmitted through the coaxial cable, and transmit- (Continued)

ting the superposed signal to a signal processing module; and the powered device comprises a second active inductor module for receiving, through the coaxial cable, the DC signal, and transmitting the DC signal to a signal acquiring module for acquiring a superposed signal, a second capacitor module for transmitting the superposed signal to the power sourcing device through the coaxial cable, and the signal acquiring module is for transmitting the superposed signal to the second capacitor module.

14 Claims, 8 Drawing Sheets

(56) References Cited

U.S. PATENT DOCUMENTS

| | | | | |
|---|---|---|---|---|
| 2001/0026147 | A1* | 10/2001 | Nakashimo | H02J 7/0029 |
| | | | | 320/134 |
| 2010/0049994 | A1* | 2/2010 | Ghoshal | G06F 1/26 |
| | | | | 713/300 |
| 2010/0085988 | A1 | 4/2010 | Fukuda | |
| 2013/0187445 | A1 | 7/2013 | Mutzabaugh | |
| 2017/0347062 | A1* | 11/2017 | Ye | H04N 7/102 |

FOREIGN PATENT DOCUMENTS

| | | |
|---|---|---|
| CN | 104702879 A | 6/2015 |
| CN | 104994269 A | 10/2015 |
| CN | 105978551 A | 9/2016 |
| JP | H4-290368 A | 10/1992 |
| JP | H6-153407 A | 5/1994 |
| JP | 2007329736 A | 12/2007 |
| JP | 2010-093462 A | 4/2010 |

OTHER PUBLICATIONS

Extended European search report in EP application No. 18849213.6 dated Mar. 31, 2020.
International Search Report; PCT/CN2018/100668; dated Nov. 15, 2018; 4 pages.
Notice of Reasons for Refusal of Japanese Patent Application No. 2020-531803—10 pages (dated Feb. 17, 2021).
Search Report of Japanese Patent Application No. 2020-531803—52 pages (dated Feb. 12, 2021).

* cited by examiner

SIGNAL TRANSMISSION SYSTEM AND SIGNAL TRANSMISSION METHOD

This application is a U.S. national stage application of International Patent Application No. PCT/CN2018/100668 filed on Aug. 15, 2018, which claims priority to Chinese Patent Application No. 201710726380.0, filed on Aug. 22, 2017, and entitled "SIGNAL TRANSMISSION SYSTEM AND SIGNAL TRANSMISSION METHOD", the entire contents of each of which are hereby entirely incorporated by reference.

TECHNICAL FIELD

Embodiments of the present disclosure relate to a signal transmission system and a signal transmission method.

BACKGROUND

At present, as the national economy continuously develops, to ensure security of important places such as banks, shopping malls, confidential departments, or the like, signal transmission systems for use in video monitoring systems emerge as the time requires. The video monitoring system acquires and transmits multimedia data in places under monitoring, and thus monitoring and recording of unexpected incidents in these places under monitoring are achieved. As being intuitive, accurate and abundant in information, the video monitoring system has been extensively applied in many scenarios.

The video monitoring system comprises an image acquiring device and an image parsing device. In practice, the image acquiring device and the image parsing device are respectively connected to a power supply, and enters an operating state when being conducted to the power supply. The image acquiring device is arranged at a position where video image acquisition is desired. When entering the operating state, the image acquiring device acquires a video image for the position where it is located, and transmits the acquired video image to the image parsing device. And the image parsing device parses the video image, so as to display the parsed video image.

SUMMARY

Various embodiments of the present disclosure provide a signal transmission system, the signal transmission system is configured to transmit a power signal and a superposed signal, and the signal transmission system comprises: a power supply, a power sourcing device, and a powered device; wherein the power supply is connected to the power sourcing device, and the power sourcing device is connected to the powered device through a coaxial cable;

the power sourcing device comprises a first active inductor module, a first capacitor module, and a signal processing module connected to the first capacitor module; wherein the first active inductor module is configured to receive a direct current signal transmitted by the power supply, and transmit the direct current signal to the powered device through the coaxial cable; and the first capacitor module is configured to receive a superposed signal transmitted through the coaxial cable, and transmit the superposed signal to the signal processing module;

the powered device comprises a second active inductor module, a second capacitor module, and a signal acquiring module connected to the second capacitor module; wherein the second active inductor module is configured to receive, through the coaxial cable, the direct current signal transmitted by the power sourcing device, and transmit the direct current signal to the signal acquiring module; the signal acquiring module is configured to acquire the superposed signal, and transmit the superposed signal to the second capacitor module; and the second capacitor module is configured to transmit the superposed signal to the power sourcing device through the coaxial cable.

In some embodiments of the present disclosure, the power sourcing device further comprises a control module, wherein the control module is configured to control supplying power to the powered device or control stoppings supplying power to the powered device.

In some embodiments of the present disclosure, the power sourcing device further comprises a first detecting module, wherein the first detecting module is configured to detect an operating parameter of the powered device, and the control module is configured to control a power supply amount to the powered device according to the operating parameter; and/or the power sourcing device further comprises a current detecting module, wherein the current detecting module is configured to receive the direct current signal transmitted by the power supply, and detect the direct current signal; and/or the power sourcing device further comprises a plug detecting module, wherein the plug detecting module is configured to detect the superposed signal transmitted by the powered device, and instruct the control module to control stopping supplying power to the powered device when no superposed signal is detected, or the plug detecting module is configured to receive the direct current signal transmitted by the power supply, and instruct the control module to control stopping supplying power to the powered device when the direct current signal is 0.

In some embodiments of the present disclosure, the first detecting module comprises a first detection resistor and a first voltage comparator; wherein one terminal of the first detection resistor is connected to an output terminal of the power supply, and the other terminal of the first detection resistor is connected to the first voltage comparator and the coaxial cable, respectively;

the first detection resistor and the power receiving terminal are configured to divide a voltage supplied by the power supply;

the first voltage comparator is configured to output a comparison result based on a first divided voltage detected at the other terminal of the first detection resistor and a predetermined reference voltage; and the control module is further configured to determine the operating parameter of the powered device based on the comparison result.

In some embodiments of the present disclosure, the current detecting module comprises a second detection resistor, an operational amplifier, a first switch, a third detection resistor, and a sampling module; wherein the second detection resistor is connected in series between the power supply and the powered device, the second detection resistor is connected in parallel to the operational amplifier, an output terminal of the operational amplifier is connected to the first switch, the first switch is connected to one terminal of the third detection resistor, the third detection resistor is connected in parallel to the sampling module, and the other terminal of the third detection resistor is grounded;

the operational amplifier is configured to acquire a first detection voltage across the second detection resistor, amplify the first detection voltage, and transmit the amplified first detection voltage to the first switch, such that the first switch is switched ON upon acquiring the amplified first detection voltage; and the sampling module is configured to acquire a second detection voltage across the third detection resistor after the first switch is switched ON and determine a detection current based on the second detection voltage.

In some embodiments of the present disclosure, the power sourcing device further comprises a protection module, the protection module is configured to control stopping supplying power to the powered device upon detecting that the powered device is short-circuited or the power sourcing device is short-circuited.

In some embodiments of the present disclosure, the first protection module comprises a second switch, a fourth detection resistor, a fifth detection resistor, and a second voltage comparator; wherein the fourth detection resistor and the fifth detection resistor are connected in series between the first active inductor module and the powered device, an input terminal of the second voltage comparator is connected to a first potential point between the fourth detection resistor and the fifth detection resistor, and an output terminal of the second voltage comparator is connected to the second switch;

the fourth detection resistor and the fifth detection resistor are configured to divide a voltage supplied by the power supply;

the second voltage comparator is configured to compare a second divided voltage of the first potential point with a first reference voltage;

when the second divided voltage is greater than the first reference voltage, the second voltage comparator outputs a first level signal to the second switch such that the second switch is closed; and when the second divided voltage is less than the first reference voltage, the second voltage comparator outputs a second level signal to the second switch such that the second switch is opened.

In some embodiments of the present disclosure, the plug detecting module comprises a third voltage comparator and a detection capacitor; wherein the detection capacitor is connected to the powered device, the detection capacitor is connected to an input terminal of the third voltage comparator, and an output terminal of the third voltage comparator is connected to the control module;

the detection capacitor is configured to receive the superposed signal transmitted by the powered device, and transmit the superposed signal to the third voltage comparator;

when the third voltage comparator receives the superposed signal, the output terminal of the third voltage comparator outputs a first level signal to instruct the control module to control supplying power to the powered device; and when the third voltage comparator does not receive the superposed signal, the output terminal of the third voltage comparator outputs a second level signal to instruct the control module to control stopping supplying power to the powered device.

In some embodiments of the present disclosure, the first active inductor module comprises a first capacitor, a sixth detection resistor, a seventh detection resistor, and a transistor; wherein an input terminal of the first capacitor is connected to the power supply, an output terminal of the first capacitor is connected to one terminal of the sixth detection resistor and a base of the transistor respectively, the other terminal of the sixth detector resistor is connected to the powered device, one terminal of the seventh detection resistor is connected to the power supply, the other terminal of the seventh detection resistor is connected to an emitter of the transistor, and a collector of the transistor is connected to the powered device; or the power supply is connected to one terminal of the sixth detection resistor and a collector C of the transistor respectively, an input terminal of the first capacitor is connected to the other terminal of the sixth detection resistor and a base B of the transistor, an output terminal of the first capacitor is connected to the powered device, one terminal of the seventh detection resistor is connected to an emitter E of the transistor, and the other terminal of the seventh detection resistor is connected to the powered device.

In some embodiments of the present disclosure, the powered device further comprises a filter module; wherein the filter module is configured to receive a video image acquired by the powered device, filter the video image to obtain the superposed signal, and transmit the superposed signal to the power sourcing device.

Various embodiments of the present disclosure provide a signal transmission method, comprising:

outputting, by a power supply, a direct current signal to a power sourcing device;

transmitting, by a first active inductor module of the power sourcing device, the direct current signal to a powered device over a coaxial cable upon receiving the direct current signal;

transmitting, by a second active inductor module of the powered device, an acquired superposed signal to the power sourcing device through the coaxial cable upon receiving the direct current signal; and parsing, by the power sourcing device, the received superposed signal.

In some embodiments of the present disclosure, outputting, by the power supply, the direct current signal to the power sourcing device comprises:

transmitting, by an alternating current power source of the power supply an alternating current signal to a converter;

converting, by the converter, the alternating current signal to the direct current signal upon receiving the alternating current signal; and outputting, by the converter, the direct current signal to the power sourcing device.

It is to be understood that both the foregoing general description and the following detailed description are exemplary and explanatory only and are not intended to limit the present disclosure.

BRIEF DESCRIPTION OF THE DRAWINGS

The accompanying drawings herein, which are incorporated into and constitute a part of the specification, illustrate embodiments consistent with the present disclosure, and together with the specification, serve to explain the principles of the present disclosure.

DETAILED DESCRIPTION

Figure 1:
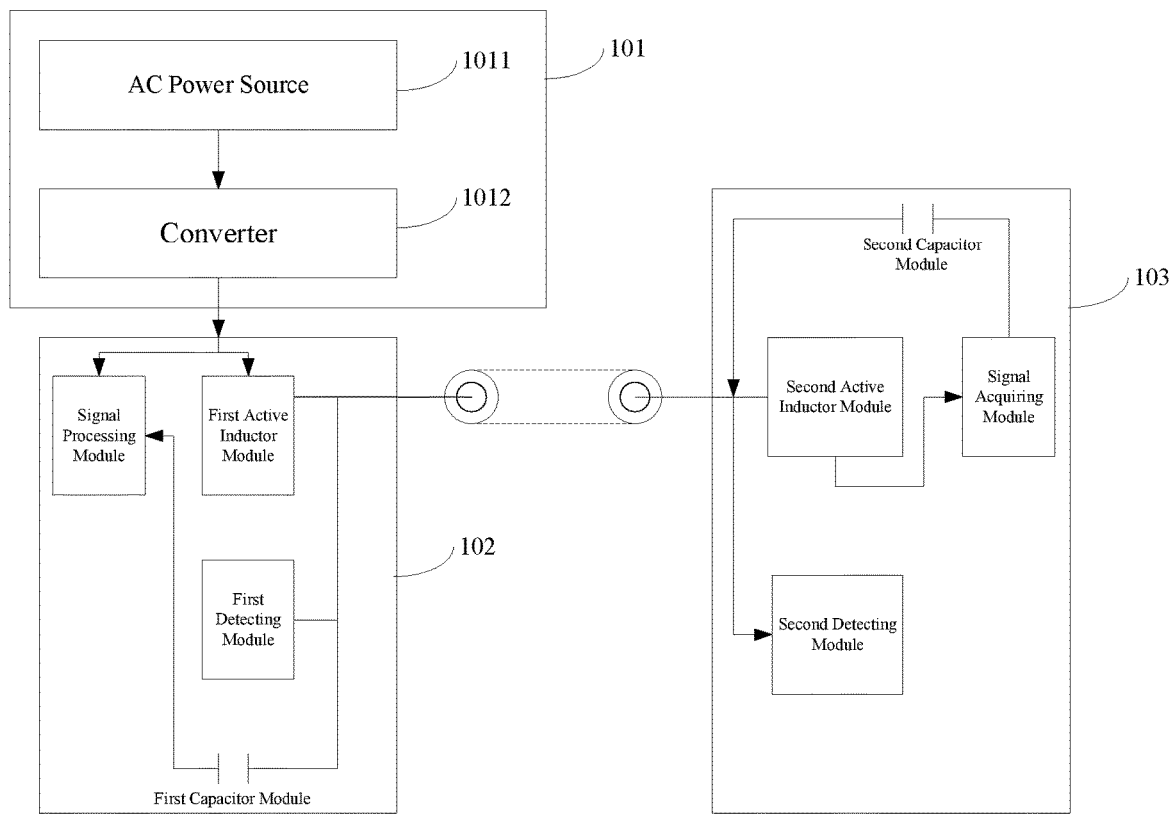
FIG. 1 is a schematic structural diagram of a signal transmission system according to an exemplary embodiment of the present disclosure.

Exemplary embodiments are described in detail herein, and examples thereof are depicted in the accompanying drawings. Where the description hereinafter relates to the accompanying drawings, unless otherwise specified, identical reference numerals in the accompanying drawings represent identical or like elements. Implementation manners described in the following exemplary embodiments do not necessarily represent all the implementation manners consistent with the present disclosure. On the contrary, these implementation manners are merely examples illustrating apparatuses and methods according to some aspects of the present disclosure, as described in the appended claims.

With respect to an image acquiring device, when a power supply supplies power to the image acquiring device, an alternating current signal from an alternating current power source is converted to a direct current signal by an alternating current/direct current (AD/DC) converter, such that the image acquiring device may normally operate upon receiving the direct current signal. However, in general, the position of the image acquiring device is outdoor, and is far away from the alternating current power source. As such, for supplying power to the image acquiring device, the power supply is required to be wired to the position of the image acquiring device, which increases workload of deploying the video monitoring system. In addition, this process is complex and costly.

FIG. 1 is a schematic structural diagram of a signal transmission system according to an exemplary embodiment of the present disclosure. As illustrated in FIG. 1, the signal transmission system comprises: a power supply 101, a power sourcing device 102, and a powered device 103. The power supply 101 is connected to the power sourcing device 102, and the power sourcing device 102 is connected to the powered device 103 through a coaxial cable. Hereinafter, the components of the system will be described.

Power Supply 101

Referring to FIG. 1, the power supply 101 comprises an alternating current power source 1011 and a converter 1012. An output terminal of the alternating current power source 1011 is connected to an input terminal of the converter 1012, and an output terminal of the converter 1012 is connected to the power sourcing device 102.

Generally, in practice, the power sourcing device can enter a normal operating state upon receiving a direct current signal. However, since the power source comprised in the power supply is an alternating current power source, and an electrical signal transmitted by the alternating current power source is an alternating current signal, the alternating current signal needs to be converted to a direct current signal on the basis of the converter. The converter can be an alternating current/direct current (AC/DC) converter.

Power Sourcing Device 102

Figure 2:
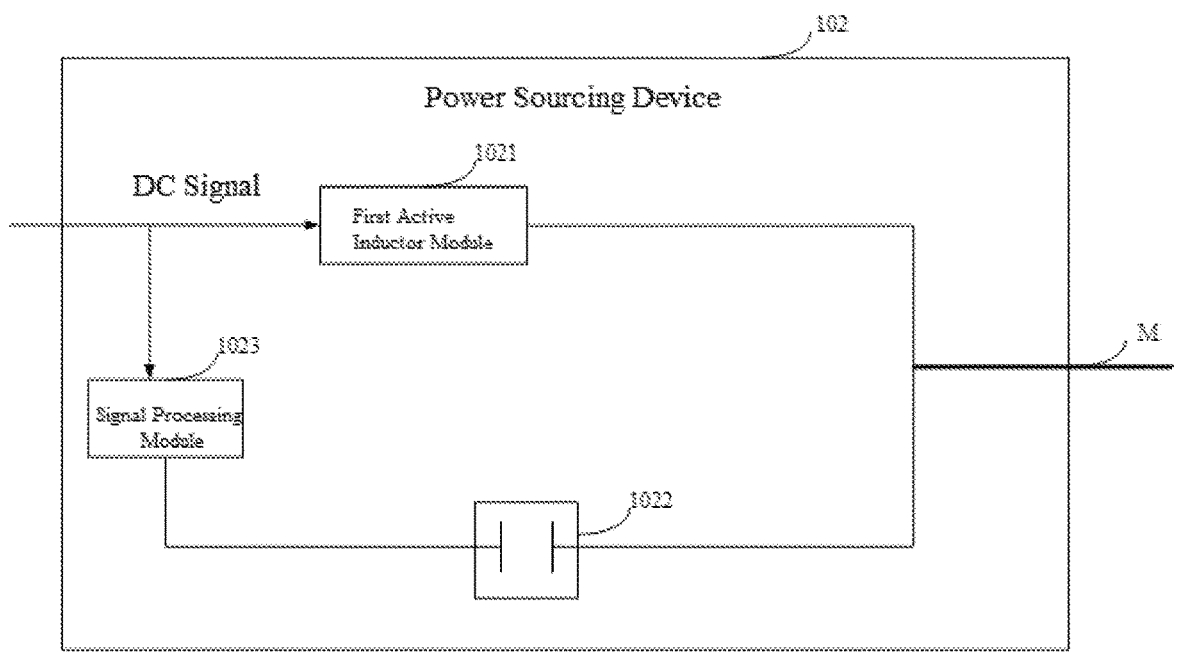
FIG. 2 is a schematic structural diagram of a power sourcing device according to an exemplary embodiment of the present disclosure.

Referring to FIG. 2, the power sourcing device 102 comprises a first active inductor module 1021, a first capacitor module 1022, and a signal processing module 1023.

An input terminal of the first active inductor module 1021 is connected to an output terminal of the power supply 101, an output terminal of the first active inductor module 1021 is connected to the powered device 103, that is, the output terminal of the first active inductor module 1021 is connected to the powered device 103 through a coaxial cable M, an input terminal of the first capacitor module 1022 is connected to the powered device 103, that is, the input terminal of the first capacitor 1022 is connected to the powered device 103 through the coaxial cable M, and an output terminal of the first capacitor module 1022 is connected to the signal processing module 1023. Hereinafter, the components of the power sourcing device 102 will be described.

(1) First active inductor module 1021: The first active inductor module 1021 is configured to receive a direct current signal transmitted by the power supply, and transmit the direct current signal to the powered device through the coaxial cable. The first active inductor module is a core module of the signal transmission system, which exhibits a high impedance against an alternating current signal and exhibits a low impedance against a direct current signal. That is, the first active inductor module implements a function of blocking the alternating current signal and transmitting the direct current signal. A signal acquired by the powered device is a superposed signal. The superposed signal may comprise an analog video signal, a digital video signal, an audio signal, and/or other non-video analog signal, or the like. The inventors have realized that the superposed signal is an alternating current signal, and an electrical signal transmitted by the power supply to the signal processing module is a direct current signal. Therefore, the first active inductor module only allows the direct current transmitted by the power supply to be transmitted, but blocking the superposed signal acquired by the signal acquiring signal from being transmitted, such that both the direct current signal and the superposed signal may be directionally transmitted. As such, during transmission of the direct current signal and the superposed signal through a coaxial cable, the direct current signal and the superposed signal may be simultaneously transmitted, and the direct current imposes no impact on the superposed signal. The superposed signal refers to a signal superposed on the coaxial cable and synchronously transmitted through the coaxial cable based on the direct current signal. It should be noted that the first active inductor module refers to a module which exhibits a high impedance against an alternating current signal and exhibits a low impedance against a direct current signal, that is, a module having a function of blocking the alternating current signal and transmitting the direct current signal. The module is functionally equivalent to an active inductor, and may be an active inductor or may be a module constituted by a plurality of electronic devices. The internal structure of the module is not limited in the present disclosure.

Since the internal structure of the first active inductor module may be embodied in a plurality of implementations. Exemplarily, the present disclosure describes the internal structure by taking the following two implementations as examples.

Figure 3:
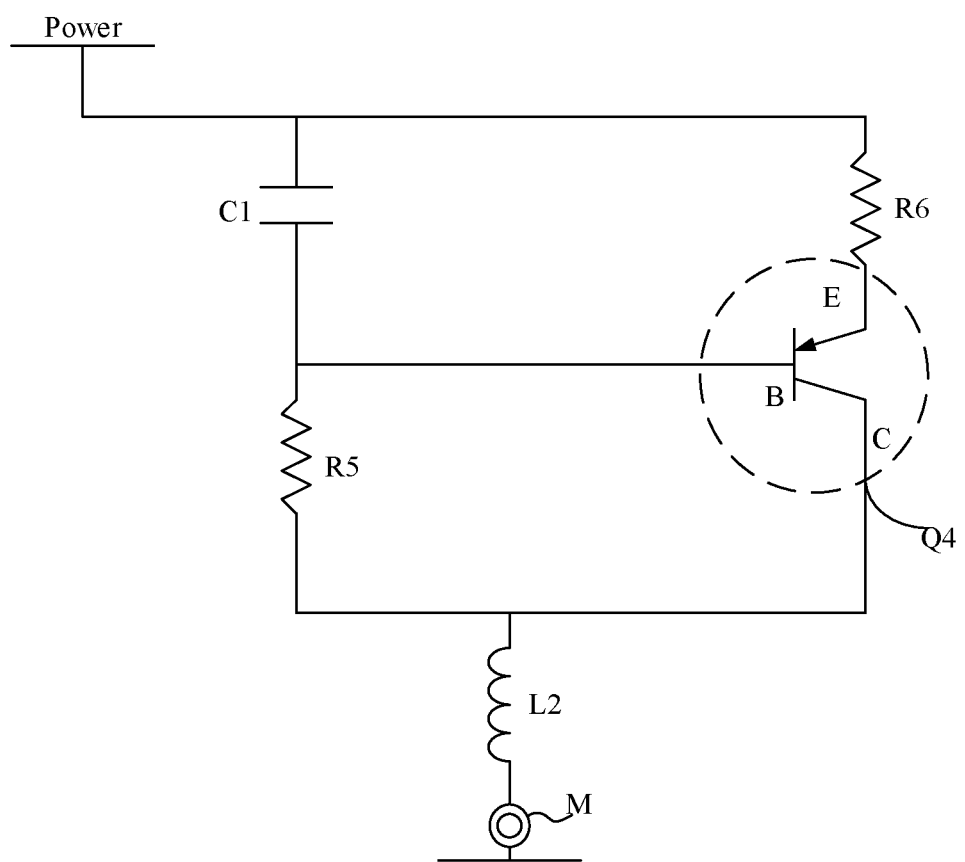
FIG. 3 is a schematic structural diagram of a first active inductor module according to an exemplary embodiment of the present disclosure.

In a first implementation, referring to FIG. 3, the first active inductor module comprises a first capacitor C1, a sixth detection resistor R5, a seventh detection resistor R6, and a transistor Q4. The transistor Q4 comprises a base B, a collector C, and an emitter E. The collector C of the transistor is connected to the powered device.

An input terminal of the first capacitor C1 is connected to the power supply, an output terminal of the first capacitor C1 is connected to one terminal of the sixth detection resistor R5 and the base B of the transistor Q4 respectively, and the other terminal of the sixth detection resistor R5 is connected to the powered device, that is, connected to the powered device through the coaxial cable M; and the seventh detection resistor R6 is connected to the power supply and the emitter E of the transistor Q4 respectively, as illustrated in FIG. 3, one terminal of the seventh detection resistor R6 is connected to the power supply, the other terminal of the seventh detection resistor R6 is connected to the emitter E of the transistor Q4, and the collector C of the transistor Q4 is connected to the powered device, that is, connected to the powered device through the coaxial cable M.

It should be noted that FIG. 3 illustrates the first active inductor module by taking the case where the transistor Q4 is a PNP-type transistor as an example. Optionally, the transistor Q4 can be an NPN-type transistor. The connection between the transistor Q4 and another electronic device can be adjusted according to the actual requirement, which is not elaborated in the present disclosure.

Figure 4:
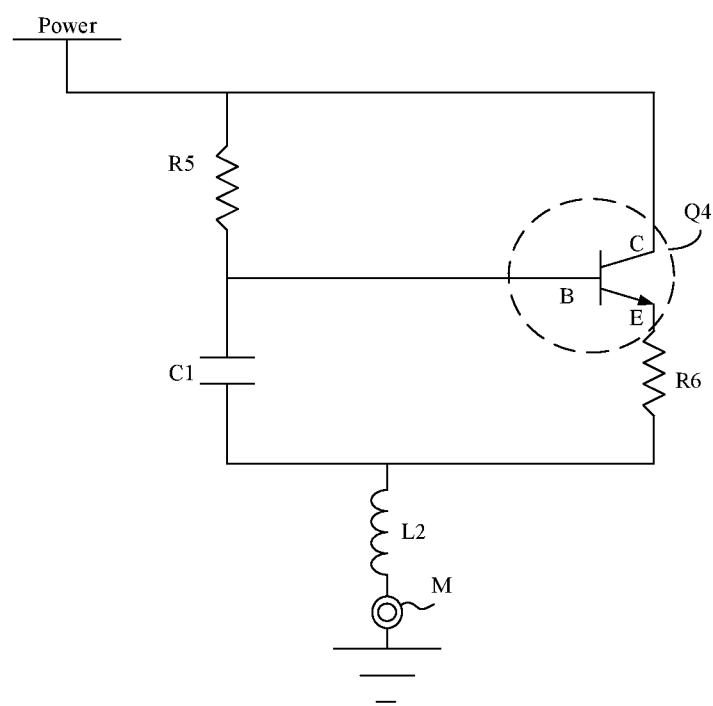
FIG. 4 is a schematic structural diagram of a first active inductor module according to another exemplary embodiment of the present disclosure.

In a second implementation, referring to FIG. 4, the first active inductor module comprises a first capacitor C1, a sixth detection resistor R5, a seventh detection resistor R6, and a transistor Q4. The transistor Q4 has a base B, a collector C, and an emitter E. The power supply is connected to one terminal of the sixth detection resistor R5 and the collector C of the transistor Q4 respectively, an input terminal of the first capacitor C1 is connected to the other terminal of the sixth detection resistor R5 and the base B of the transistor Q4 respectively, an output terminal of the first capacitor C1 is connected to the powered device, that is, connected to the powered device through the coaxial cable M, one terminal of the seventh detection resistor R6 is connected to the emitter E of the third transistor, and the other terminal of the seventh detection resistor R6 is connected to the powered device, that is, connected to the powered device through the coaxial cable M.

It should be noted that FIG. 4 illustrates the first active inductor module by taking the case where the transistor Q4 is an NPN-type transistor as an example. Optionally, the transistor Q4 may be a PNP-type transistor. The connection between the transistor Q4 and another electronic device can be adjusted according to the actual requirement, which is not elaborated in the present disclosure.

In practice, referring to FIG. 3 and FIG. 4, the first active inductor module may further comprise an inductor L2. The inductor L2 is connected to the coaxial cable (the inductor L2 may be directly connected or indirectly connected to the coaxial cable). In this way, an induction of the first active inductor module can be obtained by the following formula.

$$L = C1*R5*R6 + L2$$

In the above formula, L1 is an induction of the first active inductor module; C1 is a capacitance of the first capacitor; R5 is a resistance of the sixth detection resistor; R6 is a resistance of the seventh detection resistor; and L2 is an induction of the inductor.

It should be noted that the first implementation is described by taking the case where the transistor Q4 is a PNP-type transistor as an example, and the second implementation is described by taking the case where the transistor Q4 is an NPN-type transistor. In a possible implementation, the sixth detection resistor and the seventh detection resistor in FIG. 3 and FIG. 4 can be both replaced by inductors, or may be either replaced by an inductor. The transistor may be an NPN (current sinking) or a PNP (current sourcing) transistor, or may be a Darlington transistor formed by a plurality of NPN transistors or by a plurality of PNP transistors or by a combination of PNP transistor and NPN transistor. The present disclosure sets no limitation to construction of the first active inductor module.

(2) First capacitor module 1022: The first capacitor module 1022 is configured to receive a superposed signal transmitted through the coaxial cable, and transmit the superposed signal to the signal processing module. The first capacitor module exhibits a high impedance against a direct current signal and exhibits a low impedance against an alternating current signal, that is, having a function of blocking the direct current signal and transmitting the alternating current signal. Since the superposed signal is an alternating current, the first capacitor only allows the superposed signal to be transmitted, but blocks the direct current from being transmitted. This ensures directional transmission of both the direct current signal and the superposed signal, and prevents transmission of the direct current signal from imposing impacts on the superposed signal. It should be noted that the first capacitor module refers to a module which exhibits a high impedance against a direct current signal and exhibits a low impedance against an alternating current signal, that is, a module having a function of transmitting the alternating current signal and blocking the direct current signal. The module is functionally equivalent to a capacitor, and may be a capacitor or may be a module constituted by a plurality of electronic devices. In practice, the first capacitor module may be essentially a capacitor element. The internal structure of the module is not limited in the present disclosure.

(3) Signal processing module 1023: The signal processing module 1023 is configured to receive a superposed signal transmitted by the powered device, and parse and filter the superposed signal. Exemplarily, if the superposed signal is a video signal, the signal processing module 1023 may restore the superposed signal to obtain a video image, such that the video image is displayed on a display device. In this way, signal transmission between the powered device and the power sourcing device is implemented.

It should be noted that in practice, for security of the power sourcing device and the powered device, the power sourcing device may further comprise at least one of a first detecting module, a current detecting module, a protection module, a plug detecting module, and a control module.

The control module is configured to control supplying power to the powered device or control stopping supplying power to the powered device. Controlling stopping supplying power to the powered device may be cutting off power supplying from the power supply to the powered device.

The first detecting module is configured to detect an operating parameter of the powered device. The control module is configured to control power supplying to the powered device according to the operating parameter, that is, controlling a power supply amount (that is, the magnitude of power supplying) to the powered device. For example, the control module performs classification on the powered device according to the operating parameter, such that the power supply amount to the powered device is controlled according to the classification of the powered device. Exemplarily, if the powered device is a camera configured to shoot an image, the first detecting module can be referred to as a first camera detecting module.

The current detecting module is configured to receive a direct current signal transmitted by the power supply, and detect the direct current signal.

The plug detecting module is configured to detect a superposed signal transmitted by the powered device, and instruct the control module to control stopping supplying power to the powered device if no superposed signal is detected; or the plug detecting module is configured to receive a direct current signal transmitted by the power supply, and instruct the control module to control stopping supplying power to the powered device if the direct current signal is 0.

Figure 5:
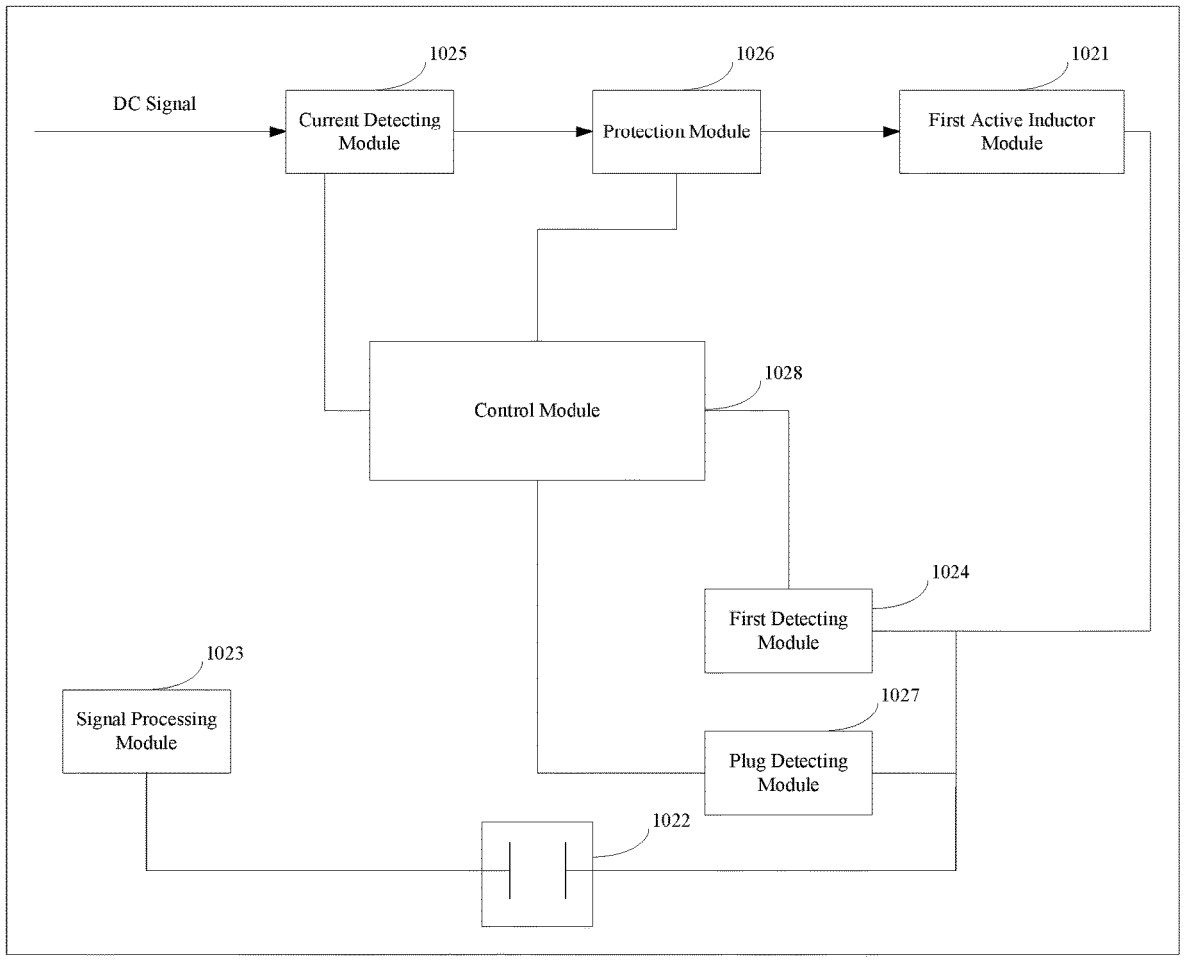
FIG. 5 is a schematic structural diagram of a power sourcing device according to an exemplary embodiment of the present disclosure.

Referring to FIG. 5, FIG. 5 is a schematic structural diagram of a power sourcing device. It is assumed that the power sourcing device further comprises a first detecting module 1024, a current detecting module 1025, a protection module 1026, a plug detecting module 1027, and a control module 1028. Exemplarily, one terminal of the first detecting module 1024 is connected to the power supply 101, the other terminal of the first detecting module 1024 is connected to the control module 1028, the first detecting module 1024 is further connected to the powered device through the coaxial cable M, the current detecting module 1025 is connected to the power supply 101 and the control module respectively, the protection module 1026 is connected to the control module 1028 and the current detecting module 1025 respectively, the protection module 1026 can further be connected to the control module 1028, the plug detecting module 1027 is connected to the power supply 101 and the control module 1028 respectively, and the plug detecting module 1027 is further connected to the powered device through the coaxial cable. It should be noted that FIG. 5 is a schematic diagram only illustrating connections between various modules in a power sourcing device. In practice, the connections between the various modules in the power sourcing device can further be adjusted according to the actual requirement. For example, the protection module 1026 may not be connected to the control module 1028. The embodiments of the present disclosure set no limitation to the connections between various modules in the power sourcing device.

Various components of the power sourcing device 102 will be described hereinafter.

(4) First detecting module 1024: The first detecting module 1024 detects an operating parameter of the powered device. Exemplarily, before the power sourcing device is powered on, the first detecting module 1024 detects the operating parameter of the powered device, the control module perform classification on the powered device according to the operating parameter (for example, powered devices with different resistances and/or different voltages are classified into various classifications, and different powers are supplied to powered devices of different classifications), such that power supplying to the powered device, that is, a power supply amount, is controlled according to the classification of the powered device. This prevents an over-high voltage loaded to the powered device, and thus protects the powered device from being damaged. The operating parameter may be a voltage, a power, a charging duration, or the like of the powered device. During acquisition of the operating parameter, the operating parameter may be detected through at least one of detecting resistor, detecting inductor and detecting capacitor. The resistor, the inductor, and the capacitor are elements of the powered device. That is, the operating parameter of the powered device may be determined through detecting the elements of the powered device.

In practice, for simplification of the detection and quick acquisition of the operating parameter of the powered device, the operating parameter can be detected through detecting resistor. As such, referring to FIG. 6, when detecting the operating parameter through detecting resistor, the first detecting module comprises a first detection resistor R11 and a first voltage comparator U1, wherein the first detection resistor is connected to the first voltage comparator. Exemplarily, one terminal of the first detection resistor R11 is connected to an output terminal of the power supply, and the other terminal of the first detection resistor R11 is connected to the first voltage comparator U1 and the powered device respectively, that is, connected to the powered device through the coaxial cable M.

Figure 6:
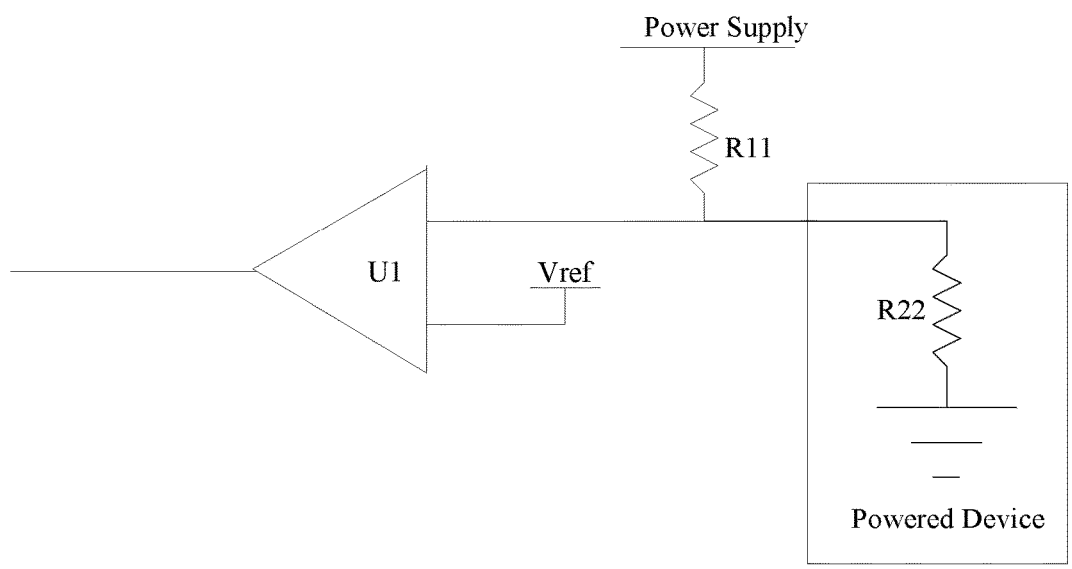
FIG. 6 is a schematic structural diagram of a first detecting module according to an exemplary embodiment of the present disclosure.

As illustrated in FIG. 6, an internal resistance may be present in the powered device, wherein the internal resistance can be represented by R22. In addition, a voltage-dividing resistor may be provided in the powered device, which is not specifically limited in the present disclosure.

When the first detecting module is operating, the first detecting module performs voltage division on a voltage across the powered device based on the first detection resistor, and outputs a first divided voltage obtained by voltage division to the first voltage comparator. That is, the first detection resistor R11 and the powered device (R22 in FIG. 6) are configured to divide a voltage supplied by the power supply. The first voltage comparator is configured to output a comparison result to the control module based on a first divided voltage detected at the other terminal of the first detection resistor and a predetermined reference voltage Vref, such that the control module determines, according to the comparison result, the operating parameter of the powered device. Further, the control module can control the power supply amount to the powered device according to the operating parameter.

In some embodiments of the present disclosure, the control module can determine, based on the comparison result, whether the powered device is a device supporting the coaxial cable. Correspondingly, the operating parameter is an indication identifier, wherein the indication identifier is intended to indicate whether the powered device is a device supporting the coaxial cable. The comparison result can be output in the form of high and low level signals. Exemplarily, assuming that the high level signal is 1 and the low level signal is 0, if receiving the high level signal, the control module determines that the powered device is a device supporting the coaxial cable; and if receiving the low level signal, the control module determines that the powered device is a device not supporting the coaxial cable.

It should be noted that the operating parameter may be obtained by the first detecting module, and then transmitted to the control module. For example, during detection of the operating parameter by detecting capacitor, the first detecting module can determine the charging duration of the powered device based on the capacitance of the powered device, and then correspondingly, the operating parameter is the charging duration. The operating parameter can also be determined by the control module based on indication information, wherein the indication information is information output by the first detecting module to the control module, and intended to reflect the operating parameter. FIG. 6 illustrates the first detecting module by taking the case where the first detecting module outputs indication information intended to reflect the operating system to the control module as an example, wherein the indication information is a comparison result output by the first voltage comparison result.

It should be noted that the structure of the first detecting module is only schematically illustrated. Instead, other structures may also be applicable. For example, the first detecting module may comprise a plurality of comparators, or at least one process, which is not limited in the present disclosure.

It should be noted that for security of the powered device and prevention of errors in controlling the powered device by the control module and damages to the powered device caused by such errors, for example, the powered device is damaged due to an over-high voltage loaded to the powered device, the first detecting module is additionally provided in the powered device. In practice, for simplification of signal transmission and reduction of cost, the first detecting module may not be provided, which is not specifically limited in the embodiment of the present disclosure.

Figure 7:
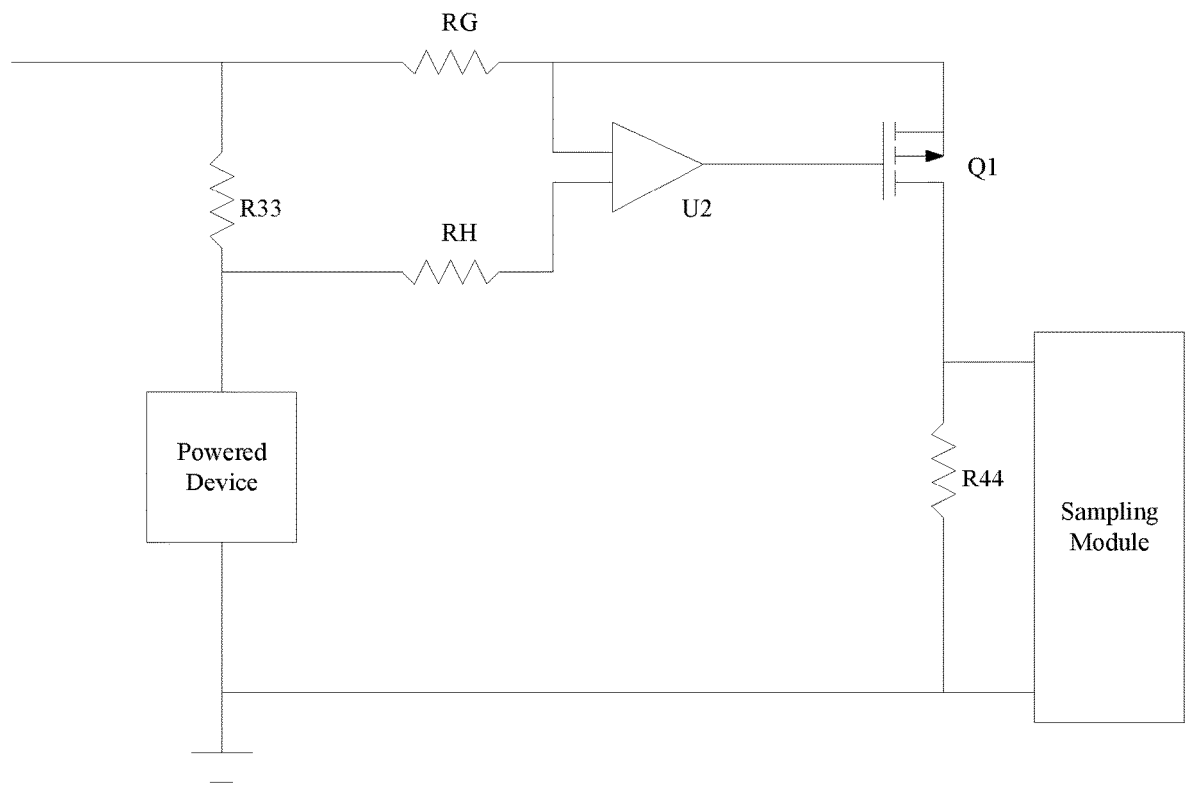
FIG. 7 is a schematic structural diagram of a current detecting module according to an exemplary embodiment of the present disclosure.

(5) Current detecting module 1025: The current detecting module 1025 is configured to receive a direct current signal transmitted by the power supply, and detect the direct current signal. The inventors have realized that when the power supply supplies power to the power sourcing device, current fluctuations may be present. If the current is overgreat, the power sourcing device may be prone to damages. Therefore, in the operating state of the power sourcing device, current loaded to the powered device is required to by detected. Referring to FIG. 7, the current detecting module comprises a second detection resistor R33, an operational amplifier U2, a first switch Q1, a third detection resistor R44, and a sampling module. The second detection resistor R33 is connected in series between the power supply and the powered device, that is, the second detection resistor R33 is connected in series between the power supply and a port of the coaxial cable, the powered device is grounded, the second detection resistor R33 is connected in parallel to the operational amplifier U2, an output terminal of the operational amplifier U2 is connected to the first switch Q1, the first switch Q1 is connected to one terminal of the third detection resistor R44, the other terminal of the third detection resistor R44 is grounded, and the third detection resistor R44 is connected in parallel to the sampling module. For security of the current detecting module and prevention of short circuits of the current detecting module, a load may be connected in the current detecting module.

When the current detecting module is operating, a first detection voltage may be generated when the direct current signal transmitted by the power supply flows through the second detection resistor. The operational amplifier acquires the first detection voltage, amplifies the first detection voltage, and transmits the amplified first detection voltage to the first switch. The first switch can be switched ON upon receiving the first detection voltage. After the first switch is switched ON, a circuit may be formed in the current detecting module, and the current can flow through the third detection resistor, such that a second detection voltage is generated across the third detection resistor. The sampling module acquires the second detection voltage, and determines a detection current based on the second detection voltage, wherein the detection current is a current loaded to the powered device. The control module can control, based on the acquired detection current, the power supplying device to supply power to the powered device or to stop supplying power to the powered device, or control a power supply amount to the powered device based on the acquired detection current.

During practice of the present disclosure, corresponding electronic devices or elements can be increased or decreased according to the actual requirement. For example, in FIG. 7, a resistor RG and a resistor RH are respectively connected in series to both input terminals of the operational amplifier U2.

It should be noted that for security of the power sourcing device and prevention of damages to the power sourcing device caused by current fluctuations, the current detecting module is additionally provided in the power sourcing device. In practice, for simplification of signal transmission and reduction of cost, the current detecting module may not be provided, which is not specifically limited in the embodiment of the present disclosure.

(6) Protection module 1026: The protection module 1026 is configured to control the power sourcing device to stop supplying power to the powered device upon detecting that the power sourcing device is short-circuited. For example, the protection module is provided on a power supply path between the power supply and the powered device, and directly cuts off power supplying from the power supply to the power sourcing device upon detecting that the power sourcing device is short-circuited, for example, cutting off the power supply path between the power supply and the powered device. Alternatively, the protection module 1026 is configured to instruct the control module to cut off power supplying from the power supply to the power sourcing device when detecting that the power sourcing device is short-circuited. The inventors have realized that when the power supply is operating, it is probable that the power supply path of the power supply may be short-circuited due to line faults or misoperations (that is, the power sourcing device is short-circuited), or the powered device is short-circuited. For timely topping power supplying to the power sourcing device in the case of short-circuits, and prevention of damages to the power sourcing device, the protection module is additionally provided in the power sourcing device, such that the protection module controls the power sourcing device to stop supplying power to the powered device when the power sourcing device or the powered device is short-circuited. For example, the protection module may instruct the control module to control cutting off power supplying from the power supply to the power sourcing device.

Figure 8:
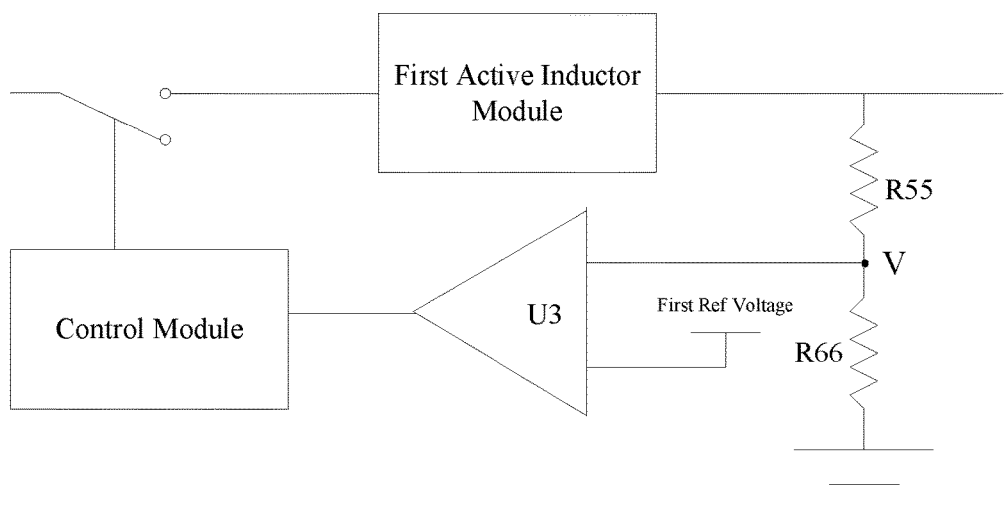
FIG. 8 is a schematic structural diagram of a protection module according to an exemplary embodiment of the present disclosure.

In some embodiments of the present disclosure, referring to FIG. 8, the protection module comprises a fourth detection resistor R55, a fifth detection resistor R66, and a second voltage comparator U3. The fourth detection resistor R55 and the fifth detection resistor R55 are connected in series between the first active inductor module and the powered device, that is, these two resistors are connected in series between the first active inductor module and the port of the coaxial cable M, and the powered device is grounded. Therefore, the fifth detection resistor R66 is grounded, an input terminal of the second voltage comparator U3 is connected to a first potential point V between the fourth detection resistor R55 and the fifth detection resistor R66, and an output terminal of the second voltage comparator U3 is connected to the control module. When the protection module is operating, the fourth detection module R55 and the fifth detection module R66 carry out voltage division on the voltage output by the power supply to obtain a second divided voltage, and transmit the second divided voltage to the second voltage comparator U3. That is, the fourth detection resistor R55 and the fifth detection resistor R66 are configured to carry out voltage division on the voltage output by the power supply. When receiving the second divided voltage, the second voltage comparator compares the second divided voltage with a first reference voltage. That is, the second voltage comparator compares the second divided voltage at the first potential point V with the first reference voltage. If the second divided voltage is greater than the first reference voltage, it indicates that the current voltage supplied from the power supply to the power sourcing device is low, and does not exceed a voltage range that the power sourcing device can withstand. Therefore, the second voltage comparator U3 outputs a first level signal to the control module, to instruct the control module to control the power sourcing device to supply power to the powered device, and to control the power supply to continuously supply power to the power sourcing device. If the second divided voltage is less than the first reference voltage, it indicates that the voltage supplied from the power supply to the power sourcing device is too low, such that the current of the power sourcing device exceeds a current that the power sourcing device can withstand, and a short-circuit may probably occur at present. In this case, the second voltage comparator U3 outputs a second level signal to the control module, to instruct the control module to control the power sourcing device to stop supplying power to the powered device, that is, cutting off power supplying from the power supply to the power sourcing device (for example, cutting off a power supply path between the power sourcing device and the power supply), thereby preventing damages caused to the power sourcing device due to short-circuits. Generally, when the first active inductor module in the power sourcing device is normally operating, the voltages at both terminals thereof are both no more than 2 V. Therefore, the first reference voltage in the second voltage comparator can be set based on the voltage when the first active inductor more normally operates.

It should be noted that FIG. 8 illustrates the protection module by taking the case where the protection module is connected to the control module to implement short circuit protection as an example. However, in a possible implementation, the protection module may independently implement short circuit protection. For example, the protection module is arranged on a power supply path between the power supply and the powered device, and the protection module is configured to cut off the power supply path between the power supply and the powered device upon detecting that the powered device is short-circuit or the power sourcing device is short-circuited.

Figure 9:
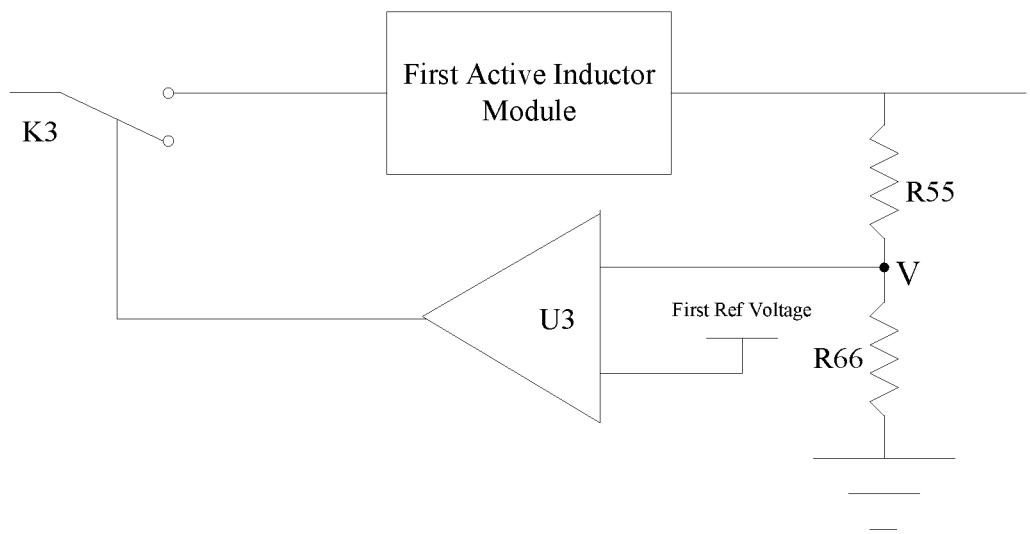
FIG. 9 is a schematic structural diagram of a protection module according to an exemplary embodiment of the present disclosure.

In some embodiments of the present disclosure, referring to FIG. 9, the protection module comprises a second switch K3, a fourth detection resistor R55, a fifth detection resistor R66, and a second voltage comparator U3. The fourth detection resistor R55 and the fifth detection resistor R55 are connected in series between the first active inductor module and the powered device, that is, these two resistors are connected in series between the first active inductor module and the port of the coaxial cable M, and the powered device is grounded. Therefore, the fifth detection resistor R66 is grounded, an input terminal of the second voltage comparator is connected to a first potential point V between the fourth detection resistor R55 and the fifth detection resistor R66, and an output terminal of the second voltage comparator is connected to the second switch K3. When the protection module is operating, the fourth detection module R55 and the fifth detection module R66 carry out voltage division on the voltage output by the power supply to obtain a second divided voltage, and transmit the second divided voltage to the second voltage comparator U3. That is, the fourth detection resistor R55 and the fifth detection resistor R66 are configured to carry out voltage division on the voltage output by the power supply. When receiving the second divided voltage, the second voltage comparator compares the second divided voltage with a first reference voltage. That is, the second voltage comparator compares the second divided voltage at the first potential point V with the first reference voltage. If the second divided voltage is greater than the first reference voltage, it indicates that the current voltage supplied from the power supply to the power sourcing device is low, and does not exceed a voltage range that the power sourcing device can withstand. Therefore, the second voltage comparator U3 outputs a first level signal to the second switch K3, to close the second switch K3 to control the power supply to supply power to the power sourcing device, that is, maintaining power supplying from the power supply to the power sourcing device. If the second divided voltage is less than the first reference voltage, it indicates that the voltage supplied from the power supply to the power sourcing device is over-high, such that the current of the power sourcing device exceeds a current that the power sourcing device can withstand, and a short-circuit may probably occur at present. In this case, the second voltage comparator U3 outputs a second level signal to the second switch K3, to open the second switch K3 to control the power supply to stop supplying power to the power sourcing device, that is, cutting off power supplying from the power supply to the power sourcing device, thereby preventing damages caused to the power sourcing device due to short-circuits.

It should be noted that the first level signal and the second level signal in FIG. 8 and FIG. 9 are two different level signals. The first level signal may be a low level signal, and the second level signal may be a high level signal. The low level signal and the high level signal are two opposite signals. That is, relative to the second level signal, the first level signal is the low level signal, and relative to the first level signal, the second level signal is the high level signal. For example, if the first level signal is 0, the second level signal is 1.

It should be noted that for security of the power sourcing device and prevention of short circuits in the power sourcing device or the powered device due to line faults or misoperations, and damages hence caused to the power sourcing device or the powered device, the protection module is additionally provided in the power sourcing device. In practice, for simplification of signal transmission and reduction of cost, the protection module may not be provided, which is not specifically limited in the embodiment of the present disclosure.

(7) Plug detecting module 1027: The plug detecting module 1027 is configured to receive a direct current signal transmitted by the power supply, and instruct the control module to stop power supplying to the power sourcing device, that is, instructing the control module to cut off power supplying from the power supply to the power sourcing device, if the received direct current signal is 0 (that is, no signal). The inventors have realized that a user of the powered device may probably disconnect the power sourcing device from the powered device due to misoperations or normal plug-in or plug-out operations for power-on or power-off of the power supply. In this case, the power sourcing device and the powered device fail to form a signal loop, and under such circumstances, the power sourcing device may highly probably still supply power to the powered device. Therefore, to prevent the user from operating the powered device which is in an ON state, the plug detecting module is additionally provided in the power sourcing device. Once it is detected that the user is performing a plug-in or plug-out operation on the powered device, power supplying to the powered device is automatically cut off.

Generally, a signal loop fails to be formed between the power sourcing device and the powered device if the power sourcing device is disconnected from the powered device. Therefore, neither the direct current signal nor the superposed signal may be transmitted between the power sourcing device and the powered device. In this case, the power sourcing device fails to receive the superposed signal transmitted by the powered device, and the direct current signal loaded to the powered device is 0. The plug detecting module can detect whether the current user is performing a plug-in or plug-out operation through detecting whether a direct current signal or a superposed signal exists in the circuitry of the current power sourcing device. During detection of the plug-in or plug-out operation of the user based on detecting whether the direct current signal exists in the circuitry, the internal structure of the plug detecting module is the same as that of the current detecting module 1025, and the detection method is also the same as the detection of the current by the current detecting module 1025.

Figure 10:
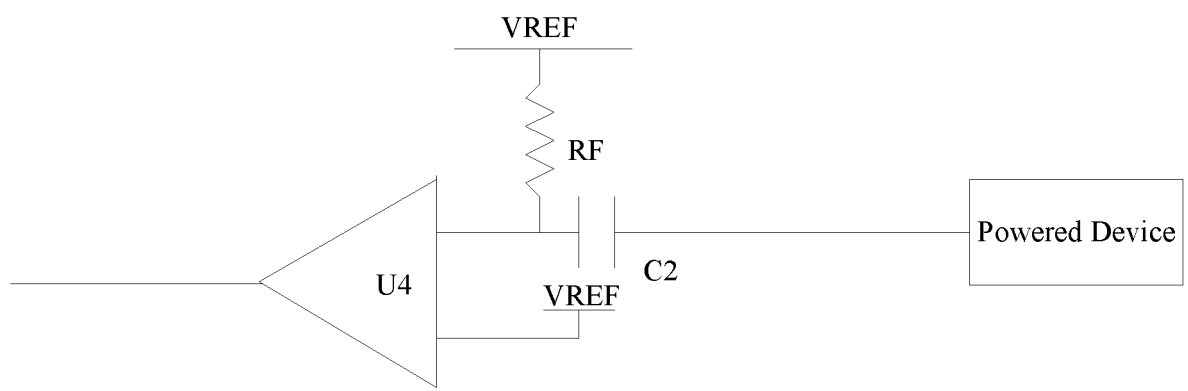
FIG. 10 is a schematic structural diagram of a plug detecting module according to an exemplary embodiment of the present disclosure.

During detection of the plug-in or plug-out operation of the user based on detecting whether a superposed signal exists in the circuitry, the plug detecting module can detect the superposed signal transmitted by the powered device. If no superposed signal is detected, the plug detecting module instructs the control module to control the power sourcing device to stop supplying power to the powered device. For example, the plug detecting module can detect whether a superposed signal is transmitted through the coaxial cable, and instruct the control module to control the power sourcing device to stop supplying power to the powered device if it is determined that no superposed signal is detected and no superposed signal is transmitted through the coaxial cable. Referring to FIG. 10, the plug detecting module can comprise a third voltage comparator U4 and a detection capacitor C2. An output terminal of the third voltage comparator is connected to the control module, the detection capacitor is connected to the powered device, the detection capacitor is connected to an input terminal of the third voltage comparator, and an output terminal of the third voltage comparator is connected to the control module. During detection of the superposed signal by the plug detecting module, the detection capacitor may constantly receive superposed signals transmitted by the signal acquiring module. When successfully receiving the superposed signal, the detection capacitor may transmit the superposed signal to the third voltage comparator U4. Since the superposed signal is an alternating current signal, when receiving the superposed signal, the third voltage comparator U4 may detect variations of the superposed signal. In this case, the third voltage comparator U4 may transmit a first level signal to the control module, to instruct the control module to control the power sourcing device to supply power to the powered device, such that the control module controls the power sourcing device to maintain the current operating state. When the detection capacitor fails to receive the superposed signal, the third voltage comparator U4 may not receive the superposed signal, and the third voltage comparator U4 may fail to detect variations of the superposed signal. In this case, the third voltage comparator U4 may transmit a second level signal to the control module, to instruct the control module to control the power sourcing device to stop supplying power to the powered device, for example, instructing the control module to control the power sourcing device to cut off power supplying from the power supply.

It should be noted that the first level signal and the second level signal in FIG. 10 are two different level signals. The first level signal may be a low level signal, and the second level signal may be a high level signal. The low level signal and the high level signal are two opposite signals. That is, relative to the second level signal, the first level signal is a low level signal, and relative to the first level signal, the second level signal is a high level signal. For example, if the first level signal is 0, the second level signal is 1.

In some embodiments of the present disclosure, if the superposed signal is a video signal, the plug detecting module may be a video signal sampling module. The video signal sampling module is connected to the control module and configured to sample the superposed signal, to detect whether a superposed signal is transmitted through the coaxial cable, and instruct the control module to control the power sourcing device to stop supplying power to the powered device if no superposed signal is transmitted through the coaxial cable.

It should be noted that for safety of the user and prevention of operations of the user on the powered device which is in an ON state, the plug detecting module is additionally provided in the power sourcing device. In practice, for simplification of signal transmission and reduction of cost, the plug detecting module may not be provided, which is not specifically limited in the embodiment of the present disclosure.

(8) Control module 1028: The control module 1028 is configured to receive instructions and level signals transmitted by the current detecting module 1025, the protection module 1026, the first detecting module 1024, and the plug detecting module 1026, and control the power sourcing device to maintain the current operating state (for example, supplying power to the powered device) or stop the current operating state (for example, stop supplying power to the powered device) according to the instructions and the level signals. The control module may also implement other functions, and other functions of the control module may be referenced to the interpretation in the above embodiments, which are not elaborated herein.

The components of the power sourcing device are described above. The first active inductor module and the first capacitor module are additionally provided in the power sourcing device. The first active inductor module has the characteristics of exhibiting a high impedance against an alternating current signal and exhibiting a low impedance against a direct current signal, and the first capacitor module has the characteristics of exhibiting a high impedance against a direct current signal and exhibiting a low impedance against an alternating current signal. Therefore, the direct current signal and the superposed signal can be simultaneously transmitted through the coaxial cable, and thus the direct current signal may cause no impact on the superposed signal. This not only ensures transmission quality of the superposed signal, but also implements power supplying to the powered device.

Powered Device 103

Figure 11:
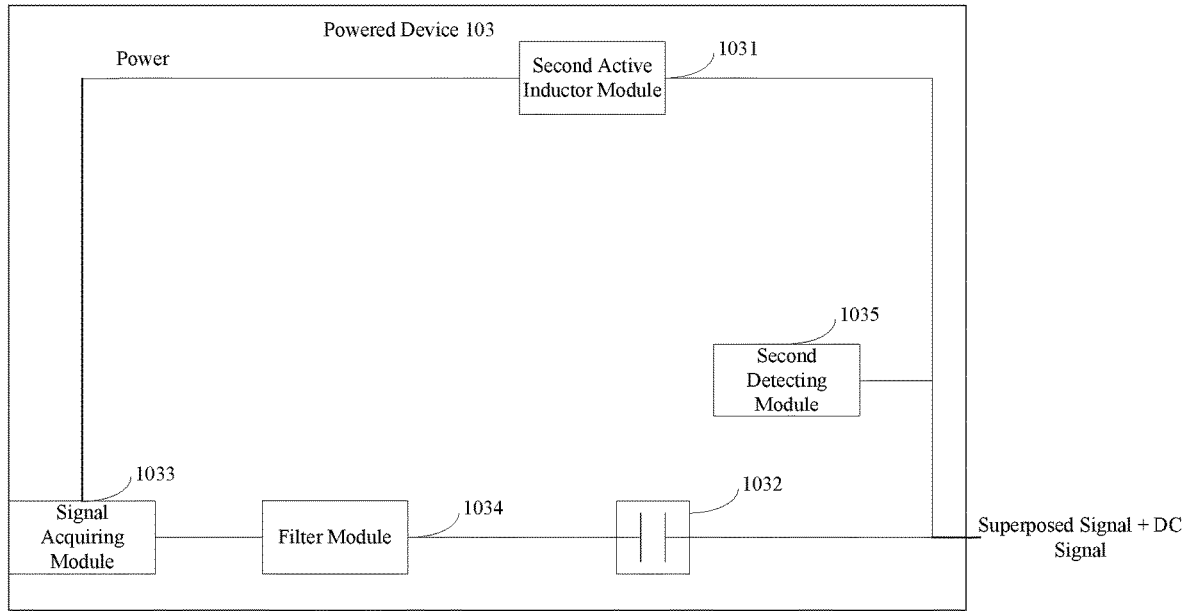
FIG. 11 is a schematic structural diagram of a powered device according to an exemplary embodiment of the present disclosure.

Referring to FIG. 11, the power sourcing device 103 comprises a second active inductor module 1031, a second capacitor module 1032, and a signal acquiring module 1033.

An input terminal of the second active inductor module is connected to the power sourcing device, an output terminal of the second active inductor module is connected to an input terminal of the signal acquiring module, an input terminal of the second capacitor module is connected to an output terminal of the signal acquiring module, and an output terminal of the second capacitor module is connected to the power sourcing device. The components of the powered device 103 are described hereinafter.

(1) Second active inductor module 1031: The second active inductor module 1031 is configured to receive a direct current signal transmitted by the power sourcing device through a coaxial cable. The second active inductor module exhibits a high impedance against an alternating current signal and exhibits a low impedance against a direct current signal, that is, the second active indicator module has a function of blocking the alternating current signal and transmitting the direct current signal. Therefore, when the power sourcing device transmits the direct current signal to the powered device through the coaxial cable, the direct current signal can flow to the second active inductor module. This ensures directional transmission of the direct current signal, and prevents the direct current from causing impacts on the superposed signal. It should be noted that the second active inductor module refers to a module which exhibits a high impedance against an alternating current signal and exhibits a low impedance against a direct current signal, that is, a module having a function of blocking the alternating current signal and transmitting the direct current signal. The module is functionally equivalent to an active inductor, and may be an active inductor or may be a module constituted by a plurality of electronic devices. The internal structure of the module is not limited in the present disclosure. Construction of the second active inductor module may be the same as that of the first active inductor module, which is not described herein any further.

(2) Second capacitor module 1032 The second capacitor module 1032 is configured to transmit the superposed signal to the power sourcing device through the coaxial cable, for example transmitting the superposed signal to the signal processing module in the power sourcing device. The second capacitor module exhibits a high impedance against a direct current signal and exhibits a low impedance against an alternating current signal, that is, having a function of blocking the direct current signal and transmitting the alternating current signal. Since the superposed signal is an alternating current, the second capacitor module only allows the superposed signal to be transmitted, but blocks the direct current from being transmitted. This ensures directional transmission of both the direct current signal and the superposed signal, and prevents transmission of the direct current signal from causing impacts on the superposed signal. It should be noted that the second capacitor module refers to a module which exhibits a high impedance against a direct current signal and exhibits a low impedance against an alternating current signal, that is, a module having a function of transmitting the alternating current signal and blocking the direct current signal. The module is functionally equivalent to a capacitor, and may be a capacitor or may be a module constituted by a plurality of electronic devices. In practice, the second capacitor module may be a capacitor element in nature. The internal structure of the module is not limited in the present disclosure.

(3) Signal acquiring module 1033: The signal acquiring module 1033 is configured to acquire the superposed signal, and transmit the superposed signal to the second capacitor module.

In some embodiments of the present disclosure, when the superposed signal is a video signal, the signal acquiring module 1033 is configured to acquire a video image signal, and transmit the video image signal to the filter module; and the filter module filters the video image signal to obtain the superposed signal, and transmits the superposed signal to the second capacitor module. An output terminal of the signal acquiring module is connected to an input terminal of the filter module.

It should be noted that, in practice, for security of the powered device, referring to FIG. 11, the powered device can further comprise a filter module 1034 and a second detecting module 1035. An input terminal of the second detecting module 1035 is connected to the power sourcing device, an input terminal of the filter module 1034 is connected to an output terminal of the signal acquiring module 1033, and an output terminal of the filter module 1034 is connected to the power sourcing device through the coaxial cable. The components are described hereinafter with respect to the power sourcing device 102.

(4) Filter module 1034: The filter module 1034 is configured to receive a video image acquired by the powered device, filter the video image to obtain the superposed signal, and transmit the superposed signal to the second capacitor module, such that the second capacitor module transmits the superposed signal to the power sourcing device. Since the second capacitor module only allows the superposed signal to be transmitted, but blocks the direct current signal, directional transmission of the superposed signal can be ensured based on the second capacitor module such that the superposed signal is transmitted to the power sourcing device. In this way, interference caused by the direct current signal on the superposed signal may be prevented. The filter module is a low-pass filter module, which can filter out noise in the acquired video signal, so as to obtain a better superposed signal.

(5) Second detecting module 1035: Exemplarily, if the powered device is a camera configured to shoot an image, the second detecting module may be referred to as a second camera detecting module.

Before the powered device is powered on, the second detecting module 1035 detects an operating parameter of the powered device, such that the powered device can be powered on based on the operating parameter of the powered device, that is, a power supply amount to the powered device is controlled according to the operating parameter of the powered device. This prevents an over-high voltage loaded to the powered device, and thus protects the powered device from being damaged. The operating parameter may be a voltage, a power, a charging duration, or the like of the powered device. The process of acquiring the operating parameter by the second detecting module is the same as the process of acquiring the operating parameter of the powered device by the first detecting module, which is not described herein any further.

It should be noted that since the first active inductor module in the signal transmission system according to the present disclosure exhibits a high impedance against an alternating current signal and exhibits a low impedance against a direct current signal, the signal transmission system according to the present disclosure can be configured to simultaneously transmitting a high-definition analog superposed signal and a direct current signal, such that the direct current may be superposed on the high-definition analog superposed signal but cause no impacts on the high-definition analog superposed signal during transmission of the high-definition analog superposed signal and the direct current signal through the coaxial cable. This ensures transmission quality of the high-definition analog superposed signal. In addition, since the superposed signal may comprise an analog superposed signal, a digital superposed signal, an audio signal, and other non-video analog signals, the present disclosure also applies to transmission of any of the above signals.

In the signal transmission system according to the embodiment of the present disclosure, the first active inductor module of the power sourcing device transmits the direct current signal to the powered device, and the second active inductor module of the powered device acquires the direct current signal, such that the power sourcing device may supply power to the powered device while receiving the superposed signal acquired by the powered device. In this way, wiring is not needed between the powered device and the alternating current power source, which reduces workload of establishing the signal transmission system, and lowers the cost.

All the above optional technical solutions may form the optional embodiments of the present disclosure in any combination, which are not described herein any further.

The apparatus according to the embodiments of the present disclosure can apply the method hereinafter. Operating procedures and operating principles of the modules in the embodiments of the present disclosure may be referenced to the description in the embodiments hereinafter.

Figure 12:
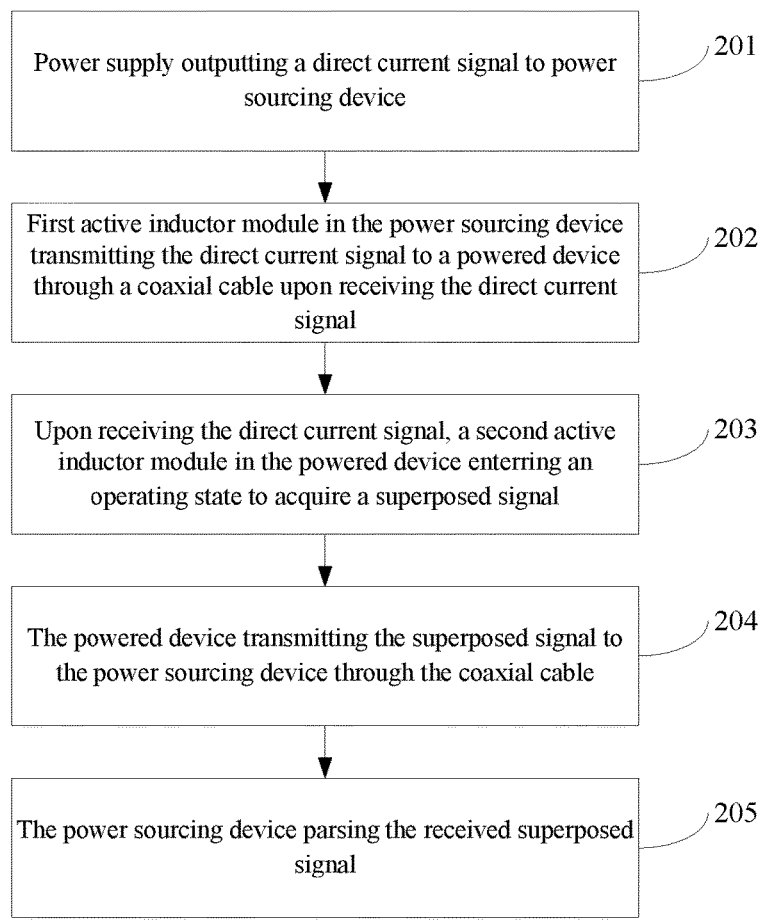
FIG. 12 is a flowchart of a signal transmission method according to an exemplary embodiment of the present disclosure.

FIG. 12 is a flowchart of a signal transmission method data according to an exemplary embodiment of the present disclosure. Referring to FIG. 12, the method is applied to a signal transmission system, and comprises the following steps.

In step 201, a power supply outputs a direct current signal to a power sourcing device.

In the embodiment of the present disclosure, the power supply comprises a power source and a converter; wherein an output terminal of the power source is connected to an input terminal of the converter, and an output terminal of the converter is connected to the power sourcing device. The power source transmits an alternating current signal to the converter, and the converter converts the alternating current signal to a direct current signal, and outputs the direct current signal to the power sourcing device. The converter can be an AC/DC converter.

In step 202, a first active inductor module in the power sourcing device transmits the direct current signal to a powered device through a coaxial cable upon receiving the direct current signal.

In some embodiments of the present disclosure, before the power sourcing device is powered on, a first detecting module detects an operating parameter of the powered device and transmits the operating parameter to a control module, the control module perform classification on the powered device according to the operating parameter, such that power supplying to the powered device is controlled according to the classification of the powered device. This prevents an over-high voltage loaded to the powered device, and thus protects the powered device from being damaged.

After the first active inductor module in the power sourcing device receives the direct current signal, the power sourcing device enters an operating state; after the power sourcing device is powered on and enters the operating state, the first active inductor module in the power sourcing device transmits the direct current signal transmitted by the power supply to the powered device through the coaxial cable, such that the powered device enters a normal operating state, and acquires a video image with respect to the position thereof It should be noted that when the power sourcing device is in the normal operating state, the direct current signal transmitted by the power supply may suffer from current fluctuations, and if the current is over-great, the power sourcing device may be prone to damages. Therefore, a current detecting module in the power sourcing device continuously detects the current flowing through the power sourcing device, and if the current in the power sourcing device is over-great, the current detecting module directly controls the power supply to stop supplying power to the power sourcing device, that is, power supplying to the power sourcing device is cut off; or the current detecting module in the power sourcing device instructs the control module to control the power supply to stop supplying power to the power sourcing device, for example, the control module in the power sourcing device is instructed to cut off power supplying to the power sourcing device.

Further, a protection module in the power sourcing device can also continuously protect circuitry when the power sourcing device is in the operating state, for example, protecting the power sourcing device. The protection module controls the power supply supplying power to stop supplying power to the powered device upon detecting that the powered device is short-circuited or the power sourcing device is short-circuited. For example, the protection module may instruct the control module to cut off power supplying from the power supply to the power sourcing device.

A user of the power sourcing device may probably disconnect the power supply from the power sourcing device, or disconnect the power sourcing device from the power supply. Therefore, to prevent the user from operating the power sourcing device which is in an ON state, a plug detecting module in the power sourcing device may instruct the control module to control the power sourcing device to cut off power supplying from the power supply upon detecting that the user of the power sourcing device is performing a plug-in or plug-out operation.

In step 203, upon receiving the direct current signal, a second active inductor module in the powered device enters an operating state to acquire a superposed signal.

In some embodiments of the present disclosure, to acquire the superposed signal may comprise: acquiring a video image to acquire a video signal. In the embodiment of the present disclosure, upon receiving the direct current signal transmitted by the power supply through the coaxial cable, the second active inductor module in the powered device enters the operating state to acquire the video image. That is, a signal acquiring module in the powered device may acquire a video superposed signal with respect to the position thereof, wherein the video superposed signal is the superposed signal.

It should be noted that before the powered device is powered on, a second detecting module detects an operating parameter of the powered device, such that a power supply amount to the powered device is controlled according to the operating parameter of the powered device. This prevents an over-high voltage loaded to the powered device, and thus protects the powered device from being damaged.

In step 204, the powered device transmits the superposed signal to the power sourcing device through the coaxial cable.

In some embodiments of the present disclosure, the signal acquiring module in the powered device transmits the acquired video image signal to a filter module in the powered device, the filter module filters the video image signal to obtain the superposed signal, and transmits the superposed signal to a second capacitor module, and the second capacitor module transmits the superposed signal to the power sourcing device.

In step 205, the power sourcing device parses the received superposed signal.

For example, when the superposed signal is a video signal, the power sourcing device parses the received superposed signal to obtain the video image, such that transmission of the direct current signal and the superposed signal is completed.

In some embodiments of the present disclosure, when the superposed signal is the video signal, a first capacitor module in the power sourcing device receives the superposed signal transmitted by the powered device through the coaxial cable, a signal processing module in the power sourcing device parses and filters the superposed signal, and obtains the video image signal by restoration, such that a display device connected to the power sourcing device can display the video image signal, and signal transmission between the power sourcing device and powered device is completed.

It should be noted that since the first capacitor module exhibits a high impedance against a direct current signal and exhibits a low impedance against an alternating current signal, the first capacitor module ensures directional transmission of both the direct current signal and the superposed signal, and prevents transmission of the direct current signal from causing impacts on the superposed signal.

In the signal transmission method according to the embodiment of the present disclosure, the first active inductor module of the power sourcing device transmits the direct current signal to the powered device, and the second active inductor module of the powered device acquires the direct current signal, such that the power sourcing device may supply power to the powered device while receiving the superposed signal acquired by the powered device. In this way, wiring is not needed between the powered device and the alternating current power source, which reduces workload of establishing the signal transmission system, and lowers the cost.

A person skilled in the art would clearly acknowledge that for ease and conciseness of description, the specific steps of the above described method may be referenced to the corresponding processes and operating principles in the above apparatus embodiments, which are thus not described herein any further.

Figure 13:
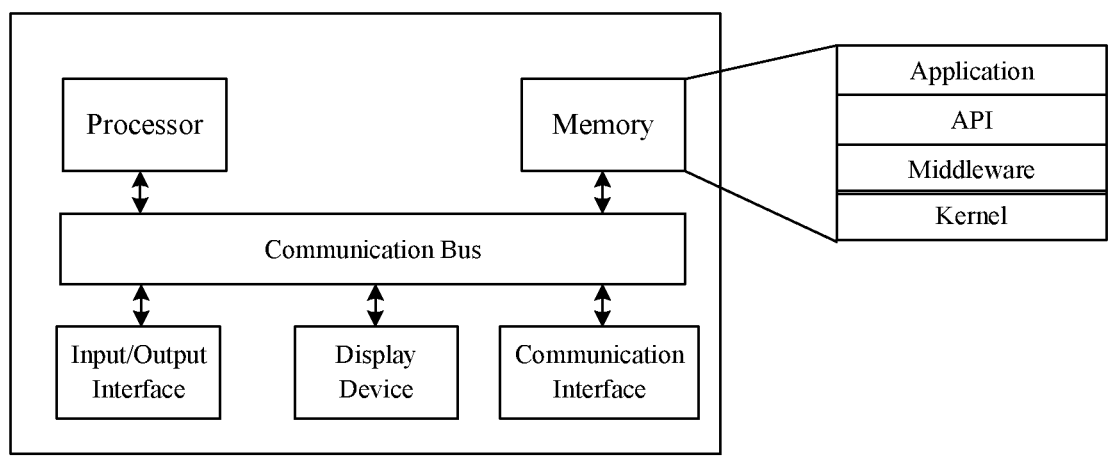
FIG. 13 is a schematic structural diagram of a computer device 300 according to an exemplary embodiment of the present disclosure.

FIG. 13 is a schematic structural diagram of a computer device 300 according to an embodiment of the present disclosure. Referring to FIG. 13, the computer device 300 comprises a communication bus, a processor, a memory, and a communication interface, and may further comprise an input/output interface and a display device; wherein various functional units may communicate with each other via the communication bus. The memory stores a computer program. The processor is configured to execute the computer program stored on the memory to perform the signal transmission method according to the above the embodiment.

The bus is a circuit connecting the elements as described above, and implements transmissions among the elements. For example, the processor receives commands from other elements via the bus, decrypts the received commands, and performs calculations or processes data according to the decrypted commands. The memory may comprise a program module, for example, a kernel, a middleware, an application programming interface (API) and an application. The program module may comprise software, firmware, or hardware, or a combination of any two thereof. The input/output interface transfers commands or data input by a user through an input/output device (for example, a sensor, a keyboard, or a touch screen). The display device displays various information to the user. The computer device 300 is connected to other network devices, user equipments, or networks via the communication interface. For example, the communication interface may be wiredly or wirelessly connected to the network for connection to other external network devices or user equipments. The wireless communication may comprise at least one of: wireless fidelity (WiFi), Bluetooth (BT), near field communication (NFC), global positioning system (GPS), and cellular communication, such as long term evolution (LTE), long term evolution-advanced (LTE-A), code division multiple access (CDMA), wideband CDMA (WCDMA), universal mobile telecommunication system (UMTS), wireless broadband (WiBro), and global system for mobile communication (GSM). The wired communication comprises at least one of: Universal Serial Bus (USB), high definition multimedia interface (HDMI), asynchronous transmission standard interface (Recommended Standard 232, RS-232), and plain old telephone service (POTS). The network may be a telecommunication network or a communication network. The communication network may be a computer network, the Internet, the Internet of Things, or a telephone network. The computer device 300 may be connected to the network via the communication interface. The protocol employed by the computer device 300 and the other network communication devices may be supported by at least one of the application, the API, the middleware, the kernel, and the communication interface.

A non-transitory computer-readable storage medium storing instructions is further provided. The instructions in the storage medium, when being executed by a processor of a signal transmission apparatus, may cause the signal transmission apparatus to perform the method as described above.

It should be noted that the connection or coupling described in the embodiments of the present disclosure refers to direct connection or indirect connection.

Other embodiments of the present disclosure can be available to those skilled in the art upon consideration of the specification and practice of the invention disclosed herein. The present application is intended to cover any variations, uses, or modifications of the present disclosure following general principles of the present disclosure and comprise the common knowledge or conventional technical means in the art without departing from the present disclosure. The specification and examples can be shown as illustrative only, and the true scope and spirit of the disclosure are indicated by the appended claims.

Understandably, this disclosure is not limited to the precise constructions described above and illustrated in the enclosed drawings, and various modifications and changes can be made without departing from the scope thereof. The scope of the present disclosure can be limited only by the appended claims.

What is claimed is:

1. A signal transmission system, wherein the signal transmission system is configured to transmit a power signal and a superposed signal, and the signal transmission system comprises:
   a power supply, a power sourcing device, and a powered device; wherein the power supply is connected to the power sourcing device, and the power sourcing device is connected to the powered device through a coaxial cable;
   wherein the power sourcing device comprises a first active inductor module, a first capacitor module, and a signal processing module connected to the first capacitor module; wherein the first active inductor module is configured to receive a direct current signal transmitted by the power supply, and transmit the direct current signal to the powered device through the coaxial cable; and the first capacitor module is configured to receive a superposed signal transmitted through the coaxial cable, and transmit the superposed signal to the signal processing module;
   wherein the powered device comprises a second active inductor module, a second capacitor module, and a signal acquiring module connected to the second capacitor module; wherein the second active inductor module is configured to receive, through the coaxial cable, the direct current signal transmitted by the power sourcing device, and transmit the direct current signal to the signal acquiring module; the signal acquiring module is configured to acquire the superposed signal, and transmit the superposed signal to the second capacitor module; and the second capacitor module is configured to transmit the superposed signal to the power sourcing device through the coaxial cable;
   wherein the power sourcing device further comprises a control module and a current detecting module, wherein the control module is configured to control supplying power to the powered device or control stopping supplying power to the powered device; and the current detecting module is configured to receive the direct current signal transmitted by the power supply, and detect the direct current signal;
   wherein the current detecting module comprises a first detection resistor, an operational amplifier, a first switch, a second detection resistor, and a sampling module;
   wherein the first detection resistor is connected in series between the power supply and the powered device, the first detection resistor is connected in parallel to the operational amplifier, an output terminal of the operational amplifier is connected to the first switch, the first switch is connected to one terminal of the second detection resistor, the second detection resistor is connected in parallel to the sampling module, and the other terminal of the second detection resistor is grounded;
   wherein the operational amplifier is configured to acquire a first detection voltage across the first detection resistor, amplify the first detection voltage, and transmit the amplified first detection voltage to the first switch, such that the first switch is switched ON upon acquiring the amplified first detection voltage; and
   wherein the sampling module is configured to acquire a second detection voltage across the second detection resistor after the first switch is switched ON and determine a detection current based on the second detection voltage.

2. The signal transmission system according to claim 1, wherein the power sourcing device further comprises at least one of a first detecting module or a plug detecting module;
   wherein the first detecting module is configured to detect an operating parameter of the powered device, and the control module is configured to control a power supply amount to the powered device according to the operating parameter; and
   wherein the plug detecting module is configured to detect the superposed signal transmitted by the powered device, and instruct the control module to control stopping supplying power to the powered device when no superposed signal is detected, or the plug detecting module is configured to receive the direct current signal transmitted by the power supply, and instruct the control module to control stopping supplying power to the powered device when the direct current signal is 0.

3. The signal transmission system according to claim 2, wherein the first detecting module comprises a third detection resistor and a first voltage comparator; wherein
   one terminal of the third detection resistor is connected to an output terminal of the power supply, and the other terminal of the third detection resistor is connected to the first voltage comparator and the coaxial cable, respectively;
   the third detection resistor and the powered device are configured to divide a voltage supplied by the power supply;
   the first voltage comparator is configured to output a comparison result based on a first divided voltage detected at the other terminal of the third detection resistor and a predetermined reference voltage; and
   the control module is further configured to determine the operating parameter of the powered device based on the comparison result.

4. The signal transmission system according to claim 2, wherein the plug detecting module comprises a third voltage comparator and a detection capacitor; wherein
   the detection capacitor is connected to the powered device, the detection capacitor is connected to an input terminal of the third voltage comparator, and an output terminal of the third voltage comparator is connected to the control module;
   the detection capacitor is configured to receive the superposed signal transmitted by the powered device, and transmit the superposed signal to the third voltage comparator;
   when the third voltage comparator receives the superposed signal, the output terminal of the third voltage comparator outputs a first level signal to instruct the control module to control supplying power to the powered device; and
   when the third voltage comparator does not receive the superposed signal, the output terminal of the third voltage comparator outputs a second level signal to instruct the control module to control stopping supplying power to the powered device.

5. The signal transmission system according to claim 2, wherein
   the power sourcing device further comprises a protection module, wherein the protection module is configured to control stopping supplying power to the powered device upon detecting that the powered device is short-circuited or the power sourcing device is short-circuited.

6. The signal transmission system according to claim 5, wherein the protection module comprises a second switch, a fourth detection resistor, a fifth detection resistor, and a second voltage comparator; wherein
the fourth detection resistor and the fifth detection resistor are connected in series between the first active inductor module and the powered device, an input terminal of the second voltage comparator is connected to a first potential point between the fourth detection resistor and the fifth detection resistor, and an output terminal of the second voltage comparator is connected to the second switch;
the fourth detection resistor and the fifth detection resistor are configured to divide a voltage supplied by the power supply;
the second voltage comparator is configured to compare a second divided voltage of the first potential point with a first reference voltage;
when the second divided voltage is greater than the first reference voltage, the second voltage comparator outputs a first level signal to the second switch such that the second switch is closed; and
when the second divided voltage is less than the first reference voltage, the second voltage comparator outputs a second level signal to the second switch such that the second switch is opened.

7. The signal transmission system according to claim 1, wherein
the power sourcing device further comprises a protection module, wherein the protection module is configured to control stopping supplying power to the powered device upon detecting that the powered device is short-circuited or the power sourcing device is short-circuited.

8. The signal transmission system according to claim 7, wherein the protection module comprises a second switch, a fourth detection resistor, a fifth detection resistor, and a second voltage comparator; wherein
the fourth detection resistor and the fifth detection resistor are connected in series between the first active inductor module and the powered device, an input terminal of the second voltage comparator is connected to a first potential point between the fourth detection resistor and the fifth detection resistor, and an output terminal of the second voltage comparator is connected to the second switch;
the fourth detection resistor and the fifth detection resistor are configured to divide a voltage supplied by the power supply;
the second voltage comparator is configured to compare a second divided voltage of the first potential point with a first reference voltage;
when the second divided voltage is greater than the first reference voltage, the second voltage comparator outputs a first level signal to the second switch such that the second switch is closed; and
when the second divided voltage is less than the first reference voltage, the second voltage comparator outputs a second level signal to the second switch such that the second switch is opened.

9. The signal transmission system according to claim 1, wherein the first active inductor module comprises a first capacitor, a sixth detection resistor, a seventh detection resistor, and a transistor; wherein
an input terminal of the first capacitor is connected to the power supply, an output terminal of the first capacitor is connected to one terminal of the sixth detection resistor and a base of the transistor respectively, the other terminal of the sixth detection resistor is connected to the powered device, one terminal of the seventh detection resistor is connected to the power supply, the other terminal of the seventh detection resistor is connected to an emitter of the transistor, and a collector of the transistor is connected to the powered device; or
the power supply is connected to one terminal of the sixth detection resistor and a collector of the transistor respectively, an input terminal of the first capacitor is connected to the other terminal of the sixth detection resistor and a base of the transistor, an output terminal of the first capacitor is connected to the powered device, one terminal of the seventh detection resistor is connected to an emitter of the transistor, and the other terminal of the seventh detection resistor is connected to the powered device.

10. The signal transmission system according to claim 1, wherein the powered device further comprises a filter module; wherein
the filter module is configured to receive a video image acquired by the powered device, filter the video image to obtain the superposed signal, and transmit the superposed signal to the power sourcing device.

11. The signal transmission system according to claim 1, wherein
the power sourcing device further comprises a protection module, wherein the protection module is configured to control stopping supplying power to the powered device upon detecting that the powered device is short-circuited or the power sourcing device is short-circuited.

12. The signal transmission system according to claim 11, wherein the protection module comprises a second switch, a fourth detection resistor, a fifth detection resistor, and a second voltage comparator; wherein
the fourth detection resistor and the fifth detection resistor are connected in series between the first active inductor module and the powered device, an input terminal of the second voltage comparator is connected to a first potential point between the fourth detection resistor and the fifth detection resistor, and an output terminal of the second voltage comparator is connected to the second switch;
the fourth detection resistor and the fifth detection resistor are configured to divide a voltage supplied by the power supply;
the second voltage comparator is configured to compare a second divided voltage of the first potential point with a first reference voltage;
when the second divided voltage is greater than the first reference voltage, the second voltage comparator outputs a first level signal to the second switch such that the second switch is closed; and
when the second divided voltage is less than the first reference voltage, the second voltage comparator outputs a second level signal to the second switch such that the second switch is opened.

13. A signal transmission method, comprising:
outputting, by a power supply, a direct current signal to a power sourcing device;

transmitting, by a first active inductor module of the power sourcing device, the direct current signal to a powered device through a coaxial cable upon receiving the direct current signal;

transmitting, by a second active inductor module of the powered device, an acquired superposed signal to the power sourcing device through the coaxial cable upon receiving the direct current signal; and parsing, by the power sourcing device, the received acquired superposed signal, wherein the power sourcing device comprises a control module and a current detecting module; wherein the control module is configured to control supplying power to the powered device or control stopping supplying power to the powered device; and the current detecting module is configured to receive the direct current signal transmitted by the power supply, and detect the direct current signal, wherein the current detecting module comprises a first detection resistor, an operational amplifier, a first switch, a second detection resistor, and a sampling module, wherein the first detection resistor is connected in series between the power supply and the powered device, the first detection resistor is connected in parallel to the operational amplifier, an output terminal of the operational amplifier is connected to the first switch, the first switch is connected to one terminal of the second detection resistor, the second detection resistor is connected in parallel to the sampling module, and the other terminal of the second detection resistor is grounded, wherein the operational amplifier is configured to acquire a first detection voltage across the first detection resistor, amplify the first detection voltage, and transmit the amplified first detection voltage to the first switch, such that the first switch is switched ON upon acquiring the amplified first detection voltage, wherein the sampling module is configured to acquire a second detection voltage across the second detection resistor after the first switch is switched ON and determine a detection current based on the second detection voltage.

14. The method according to claim 13, wherein outputting, by the power supply, the direct current signal to the power sourcing device comprises:

transmitting, by an alternating current power source of the power supply, an alternating current signal to a converter;

converting, by the converter, the alternating current signal to the direct current signal upon receiving the alternating current signal; and outputting, by the converter, the direct current signal to the power sourcing device.

* * * * *